United States Patent
Ohya et al.

(10) Patent No.: US 9,154,812 B2
(45) Date of Patent: Oct. 6, 2015

(54) TRANSMITTING SYSTEM, RECEIVING DEVICE, AND A VIDEO TRANSMISSION METHOD

(75) Inventors: Yasuo Ohya, Tokyo (JP); Sunao Wada, Kanagawa-ken (JP); Shunichi Gondo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 13/278,624

(22) Filed: Oct. 21, 2011

(65) Prior Publication Data

US 2012/0099656 A1 Apr. 26, 2012

(30) Foreign Application Priority Data

Oct. 26, 2010 (JP) .................................. 2010-240011

(51) Int. Cl.
- *H04N 7/26* (2006.01)
- *H04L 27/00* (2006.01)
- *H04N 21/2343* (2011.01)
- *H04N 19/00* (2014.01)
- *H04N 21/462* (2011.01)
- *H04N 21/63* (2011.01)

(Continued)

(52) U.S. Cl.
CPC ......... *H04N 21/234327* (2013.01); *H04N 7/26* (2013.01); *H04N 19/30* (2014.11); *H04N 21/4622* (2013.01); *H04N 21/631* (2013.01); *H04N 21/8547* (2013.01)

(58) Field of Classification Search
CPC ................................. H04N 7/26; H04L 27/00
USPC .................................................... 375/240.23
See application file for complete search history.

(56) References Cited

U.S. PATENT DOCUMENTS 6,134,382 A * 10/2000 Mishima et al. .............. 386/314
6,393,152 B2 * 5/2002 Takahashi et al. ............ 382/233

(Continued)

FOREIGN PATENT DOCUMENTS

JP 2002010251 A 1/2002
JP 2004-266503 2/2003

(Continued)

OTHER PUBLICATIONS

IEEE Wireless Communications, vol. 16, Issue 5, pp. 64-71, Oct. 2009.

(Continued)

*Primary Examiner* — Richard Torrente
*Assistant Examiner* — Irfan Habib
(74) *Attorney, Agent, or Firm* — Baker Botts L.L.P.

(57) ABSTRACT

A stream transmitting system for transmitting a data stream, which has first layer including base data and second layer including data supplementing the base data, includes a transmitting device and a receiving device. The transmitting device includes: a transmission control unit for packetizing the data of the first layer and the data of the second layer to output a data packet of the first layer and a data packet of the second layer; first transmitting unit for transmitting the data packet of the first layer to the receiving device through first transmission path; and second transmitting unit for transmitting the data packet of the second layer to the receiving device through second transmission path. The receiving device includes: first receiving units for receiving the data packet transmitted through the first transmission paths; and a reception control unit for reconstructing a hierarchically-encoded data stream.

19 Claims, 13 Drawing Sheets

(51) Int. Cl.
*H04N 21/8547* (2011.01)
*H04N 19/30* (2014.01)

(56) References Cited

U.S. PATENT DOCUMENTS

| | | | |
|---|---|---|---|
| 7,340,150 B2* | 3/2008 | Mishima et al. | 386/248 |
| 8,369,415 B2* | 2/2013 | Narasimhan | 375/240.26 |
| 2002/0118953 A1* | 8/2002 | Kim | 386/70 |
| 2002/0154886 A1* | 10/2002 | Sugiyama et al. | 386/34 |
| 2003/0099291 A1* | 5/2003 | Kerofsky | 375/240.05 |
| 2006/0239636 A1* | 10/2006 | Sugiyama et al. | 386/44 |
| 2008/0107184 A1* | 5/2008 | Katsavounidis et al. | 375/240.25 |
| 2009/0097548 A1* | 4/2009 | Karczewicz et al. | 375/240.03 |
| 2009/0187960 A1* | 7/2009 | Lee et al. | 725/131 |
| 2009/0225870 A1* | 9/2009 | Narasimhan | 375/240.26 |
| 2009/0268806 A1 | 10/2009 | Kim et al. | |
| 2010/0020867 A1* | 1/2010 | Wiegand et al. | 375/240.02 |
| 2010/0142613 A1* | 6/2010 | Zhu | 375/240.02 |
| 2010/0158127 A1* | 6/2010 | Kim et al. | 375/240.16 |
| 2011/0206133 A1* | 8/2011 | Hugosson et al. | 375/240.24 |
| 2012/0027093 A1* | 2/2012 | Amon et al. | 375/240.16 |
| 2012/0076204 A1* | 3/2012 | Raveendran et al. | 375/240.12 |
| 2012/0201301 A1* | 8/2012 | Bao et al. | 375/240.14 |
| 2012/0219055 A1* | 8/2012 | He et al. | 375/240.03 |
| 2013/0051472 A1* | 2/2013 | Wiegand et al. | 375/240.16 |
| 2013/0128990 A1* | 5/2013 | Narasimhan | 375/240.25 |

FOREIGN PATENT DOCUMENTS

| | | |
|---|---|---|
| JP | 2005160040 A | 6/2005 |
| WO | 2009016835 A1 | 2/2009 |
| WO | 2010/090439 A2 | 8/2010 |

OTHER PUBLICATIONS

Office Action in related application JP2013-226029, mailed on Apr. 21, 2015. 7 pages with translation.
Office Action in related application JP2013-226041, mailed on Apr. 21, 2015. 5 pages with translation.
Office Action issued in related Japanese Patent Appln. No. 2014-228364, mailed Aug. 18, 2015 (7 pages with translation).
Office Action issued in related Japanese Patent Appln. No. 2014-228363, mailed on Aug. 18, 2015 (7 pages with translation).

* cited by examiner

| Base [1] | Ext(A) [1] | Ext(B) [1] | Ext(A) [2] | Ext(B) [2] | Ext(A) [3] | Ext(B) [3] | Base [4] | Ext(A) [4] | Ext(B) [4] | ... |

| Transport Stream 1 | |
| --- | --- |
| Elementary Stream 1 | Base |
| Transport Stream 2 | |
| Elementary Stream 2 | Ext(A) |
| Elementary Stream 2 | Ext(B) |

*FIG. 5*

Table of Stream (1)

| PID 0x10 | Base |
|---|---|

Table Outside Stream

| PID 0x10 | Base |
|---|---|
| PID 0x20 | Ext(A) |
| PID 0x30 | Ext(B) |

FIG. 7C

TRANSMITTING SYSTEM, RECEIVING DEVICE, AND A VIDEO TRANSMISSION METHOD

CROSS-REFERENCE TO RELATED APPLICATIONS

This application is based upon and claims the benefit of priority from Japanese Patent Application No. 2010-240011 filed on Oct. 26, 2010, the entire content of which are incorporated herein by reference.

TECHNICAL FIELD

The present disclosure relates to a stream transmitting system, a transmitting device, a receiving device, a stream transmitting method and a stream transmitting program, which transmit video data and audio data in streams.

BACKGROUND

With the development of digital broadcasting and the convergence of broadcasting and communication, the development of new services in such convergence fields has been in progress.

A conventional broadcasting transmits a variety of optimized parameters in a frequency band of an allocated radio wave. A broadcast transmission path is excellent in terms of a wide coverage area and a simultaneous distribution (simultaneousness and sameness). It is suitable for transmitting a small quantity of contents to a very large number of receivers at the same time, which are distributed geographically. However, since a specification for a target receiver is predefined and it is assumed that it will be operated over a long term, it is difficult to drastically modify various parameters or amend a fundamental method at a later time.

In a conventional communication, a variety of parameters are optimized in an allowable bandwidth of a communication path prior to transmission. A communication transmission path is excellent in terms of locality and individuality. It is suitable for a case where different contents are transmitted to explicit individual terminals. Thus, a specification for a target receiver can be individually considered, and it is relatively easy to drastically modify various parameters or amend a fundamental method at a later time. Further, although there is a method of realizing a wide coverage area and a simultaneous distribution in a communication, it is advantageous in terms of quality but is disadvantageous in terms of scale and simultaneousness when compared to broadcasting.

Additionally, H.264/SVC (Scalable Video Coding) has been proposed as a technique that can dynamically change a content transmission rate or select data streams of different parameters in accordance with another receiver specification when communication quality of a transmission path is degraded by a certain cause. H.264/SVC is a technique that can previously generate and output a plurality of data streams at the same time and obtain contents of a desired transmission rate solely through a combination thereof.

More specifically, a plurality of data streams include a base stream and a plurality of extension stream. A base stream is a data stream itself of a lowest rate whereas data streams. A plurality of data stream except for the base stream are data streams configured as extension streams corresponding to each difference from the base stream. These data streams are generated in an encoding device. Thus, a transmitting device, a receiving device or a decoding device can change a transmission rate by merely increasing or decreasing the selection of the number of extension streams transmitted by the transmitting device. It is possible to obtain contents matched with a receiver specification only if unnecessary extension streams are discarded.

However, in the conventional technique, it is assumed that the video data is transmitted or received simply using a single type of transmission path. Further, it is preferable that the data streams transmitted over the broadcasting transmission path are identical to the data streams transmitted in the existing broadcasting in accordance with the receiver specification for the existing broadcasting. Under these circumstances, it is very difficult to improve playback quality using different types of transmission paths.

BRIEF DESCRIPTION OF THE DRAWINGS

FIG. 5 is a diagram showing an example of a configuration information table.

DETAILED DESCRIPTION

Hereinafter, a stream transmitting system, a transmitting device, a receiving device, a stream transmitting method and a stream transmitting program according to exemplary embodiments of the present disclosure will be described in detail with reference to the accompanying drawings.
(Configuration of Apparatus)

Figure 1:
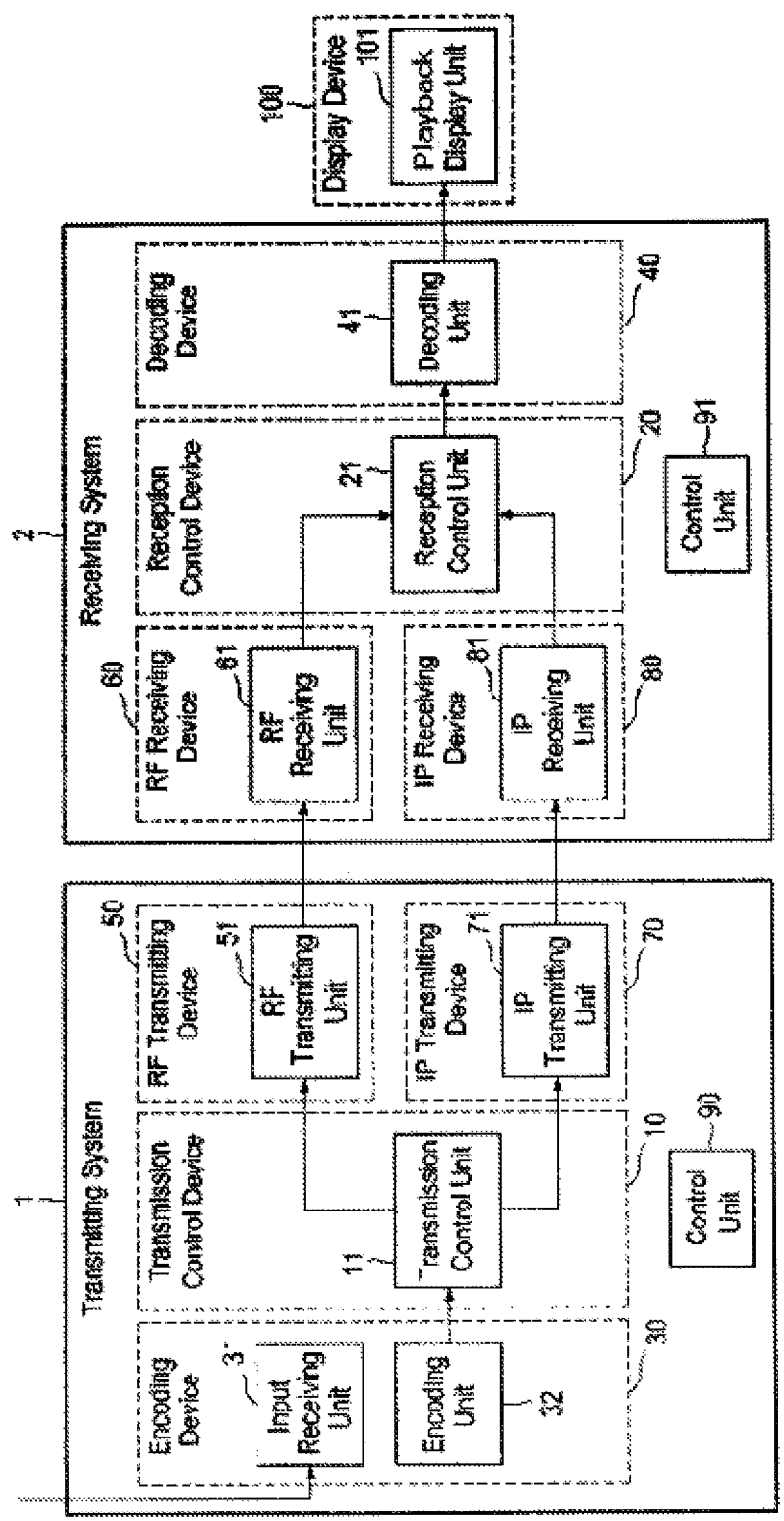
FIG. 1 is a block diagram showing an entire structure of a stream transmitting system according to an exemplary embodiment of the present disclosure.

FIG. 1 is a block diagram showing an entire structure of a stream transmitting system according to an exemplary embodiment of the present disclosure. The stream transmitting system includes a transmitting system 1 and a receiving system 2 for receiving broadcast waves transmitted from the transmitting system 1. For example, the transmitting system 1 is installed in a digital broadcast transmitting station and the receiving system 2 includes a set-top box (STB) installed in a television receiver. In the present embodiment, as an example, it is assumed that the transmitting system 1 performs transmission to the receiving system 2 through a broadcast transmission path (a first transmission path) by conventional terrestrial digital broadcast waves and transmission to the receiving system 2 through an IP communication network (a second transmission path).

In FIG. 1, the transmitting system 1 includes a transmission control device 10, an encoding device 30, a radio frequency (RF) transmitting device 50, an Internet protocol (IP) transmitting device 70 and a control unit 90. The receiving system 2 includes a reception control device 20, a decoding device 40, an RF receiving device 60, an IP receiving device 80 and a control unit 91.

The transmission control device 10 includes a transmission control unit 11. The reception control device 20 includes a reception control unit 21. The encoding device 30 includes an input receiving unit 31 and an encoding unit 32. The decoding device 40 includes a decoding unit 41. The RF transmitting device 50 includes an RF transmitting unit 51. The RF receiving device 60 includes an RF receiving unit 61. The IP transmitting device 70 includes an IP transmitting unit 71. The IP receiving device 80 includes an IP receiving unit 81. Also, the display device 100 includes a playback display unit 101.

Figure 2:
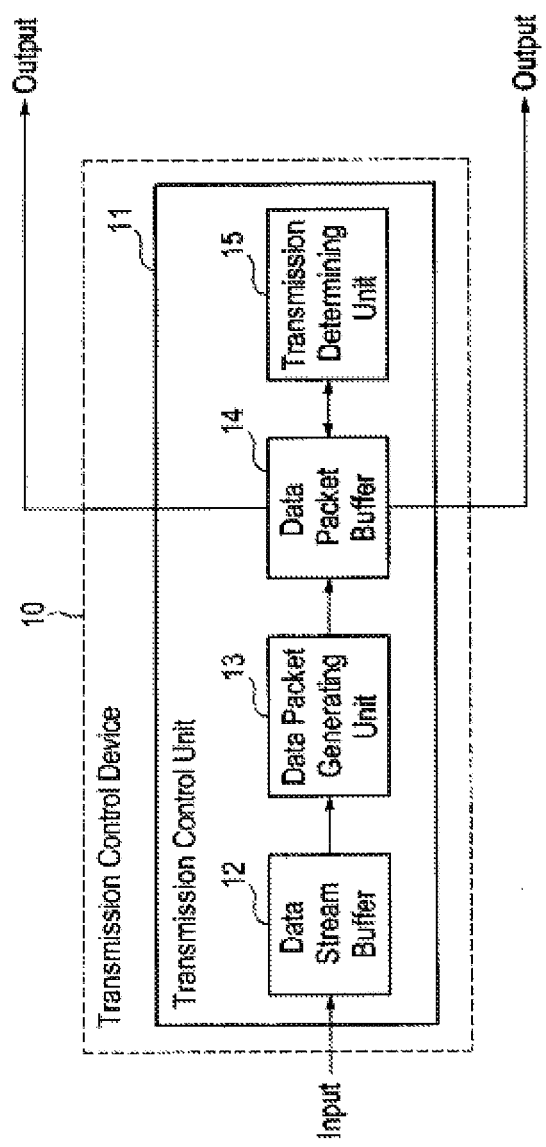
FIG. 2 is a block diagram showing a detailed structure of a transmission control unit.

FIG. 2 is a block diagram showing a detailed structure of the transmission control unit 11 of the transmission control device 10. The transmission control unit 11 includes a data stream buffer 12, a data packet generating unit 13, a data packet buffer 14 and a transmission determining unit 15.

Figure 3:
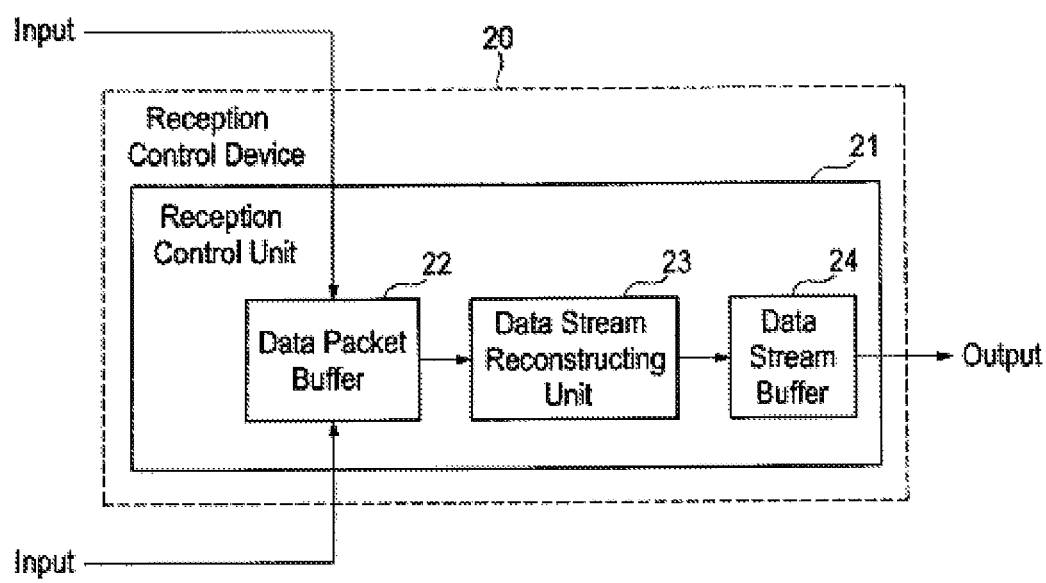
FIG. 3 is a block diagram showing a detailed structure of a reception control unit.

FIG. 3 is a block diagram showing a detailed structure of the reception control unit 21 of the reception control device 20. The reception control unit 21 includes a data packet buffer 22, a data stream reconstructing unit 23 and a data stream buffer 24.

Herein, the data stream means a stream of bits and files including audio data and video data described in a data format used in the input/output of the encoding device 30 and the decoding device 40, and it includes hierarchically-encoded data. The data packet means a stream of bits described in a data format used in the input/output of the transmitting device and the receiving device for the transmission path, and it is extracted from the data stream in the shape of a packet. This will be described below in detail.

(Connection and Operation of Respective Units)

The control unit 90 controls the transmission control device 10, the encoding device 30, the RF transmitting device 50 and the IP transmitting device 70. The control unit 91 controls the reception control device 20, the decoding device 40, the RF receiving device 60 and the IP receiving device 80.

The encoding device 30 receives data through the input receiving unit 31. Herein, an input source of the data may be any device that can be managed by the encoding unit 32 such as a hard disk, a network drive and a camera. The encoding unit 32 converts data including contents received from the input receiving unit 31 into a data stream including hierarchically-encoded data. If the data received from the input receiving unit 31 have the same format as the data outputted from the encoding unit 32, then a process of the encoding unit 32 may be omitted. In such a case, the transmission control unit 11 may be configured to directly receive the data from the input receiving unit 31.

In the transmission control device 10, the transmission control unit 11 receives the output of the encoding unit 32 and performs a control process for transmission. Then, the transmission control unit 11 transmits it from the RF transmitting unit 51 of the RF transmitting device 50 to a broadcast transmission path as well as from the IP transmitting unit 71 of the IP transmitting device 70 to an IP transmission network. Referring to FIG. 2, the transmission control unit 11 receives a data stream including hierarchically-encoded data from the encoding unit 32, stores the received data stream in the data stream buffer 12, packetizes the data stream in the data packet generating unit 13, and stores the resulting data packet in the data packet buffer 14. Herein, the transmission determining unit 15 determines an interface (RF or IP) for transmission from the data packet buffer 14 and the timing of the transmission. According to this determination, the data packet is transmitted to each transmitting device.

The data packet transmitted from the RF transmitting device 50 is received through broadcast waves by the RF receiving unit 61 in the RF receiving device 60. The data packet transmitted by the IP transmitting device 70 is received through the IP communication network by the IP receiving unit 81 in the IP receiving device 80. The data packet received through each of the RF receiving device 60 and the IP receiving device 80 is inputted into the reception control unit 21 in the reception control device 20. The reception control unit 21 performs synchronization and correlation between data and obtains an original hierarchically-encoded data stream. This data stream is decoded by the decoding unit 41 in the decoding device 40, and it is displayed on a display screen of the playback display unit 101 of the display device 100.

In FIG. 3, the reception control unit 21 in the reception control device 20 stores the data packet received from each receiving device in the data packet buffer 22, reconstructs the original hierarchically-encoded data stream in the data stream reconstructing unit 23, and stores the same in the data stream buffer 24. The data stream stored in the data stream buffer 24 is transmitted to the decoding unit 41. The transmitted timing and the transmitted data amount are optional. The decoding unit 41 may be configured to obtain the same and the control unit 91 may control this operation.

FIG. 4 is a diagram showing an example of data stream and data packet managed in the stream transmitting system according to the present disclosure.

FIG. 4A shows a basic description format of a coded data stream defined by H264/SVC (Scalable Video Coding). In FIG. 4, "Base" denotes a base layer (a first layer) and "Ext" denotes an extension layer (a second layer). Herein, two extension layers of Ext(A) and Ext(B) are present. Also, reference numerals [1]-[4] denote an index of an access unit.

Figure 4B:
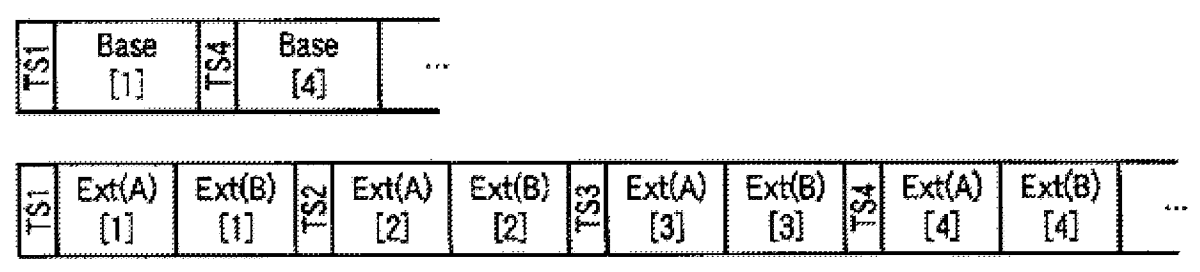

FIG. 4B shows converting the data stream of FIG. 4A into an elementary stream (i.e., an intermediate format) and classifying the same by transmission paths. In this case, a top portion represents data of a base layer and a bottom portion represents data of an extension layer. "TS" contained in each elementary stream denotes a time stamp that is given when a data stream is converted into an elementary stream.

Figure 4C:
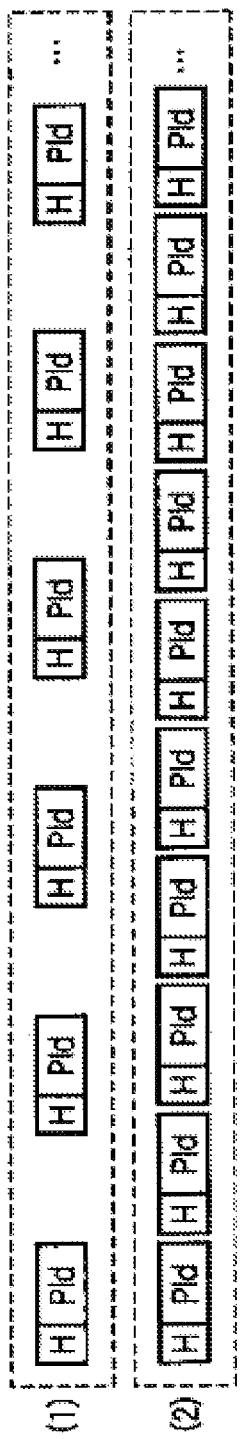
FIG. 4 is a diagram showing an example of data stream and data packet.

FIG. 4C shows packetizing a transport stream containing an elementary stream shown in FIG. 4B into data packets. "H" denotes a header and "Pld" denotes a payload. A top portion represents a data packet containing data of a base layer. A bottom portion represents a data packet containing data of an extension layer. All of the data of the elementary stream are stored in the payload of a transport stream packet.

FIG. 4 shows only hierarchically-encoded data, the transport stream packet of FIG. 4C may contain other data such as videos, audios, section information and metadata.

FIG. 5 is a diagram showing an example of a configuration information table such as a Program Map Table (PMT), which represents configuration information for the case where an H.264/SVC encoding data stream is converted into data packets. The configuration information table contains content controlled actually by the data packet generating unit 13. The content represents the correlation of data in the data packet, and it is used by the reception control unit 21 when the received data packet is reconstructed into the data stream.

(Transmission Control Process)

Figure 6:
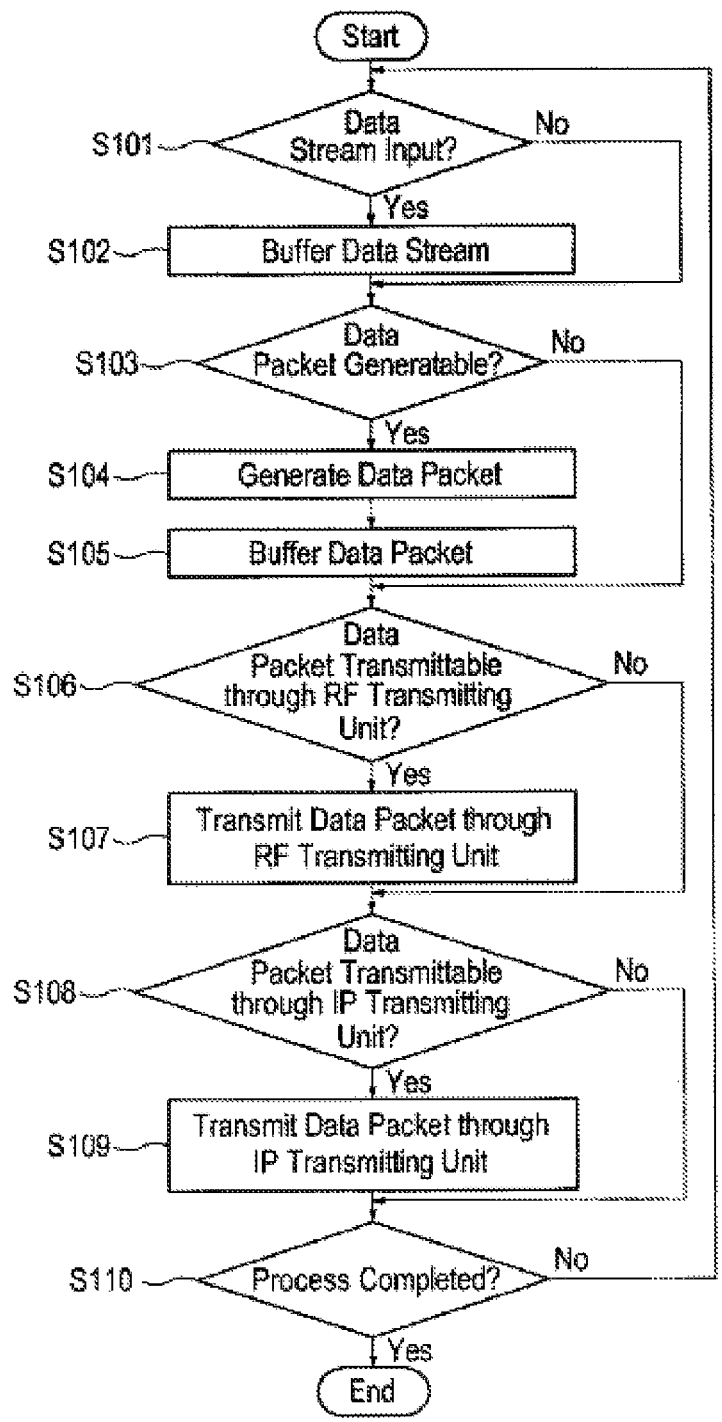
FIG. 6 is a flow chart showing an operation of a transmission control device.

FIG. 6 is a flow chart showing a process of the transmission control device 10. Herein, a description will be given of a process of outputting a data stream received from the encoding device 30 to the RF transmitting device 50 and the IP transmitting device 70. The RF transmitting device 50 is a general digital broadcast transmitting device and an input/output thereof is also pursuant to this.

First, a data stream containing hierarchically-encoded data is inputted from the encoding device 30 to the transmission control device 10 (S101). The transmission control device 10 receives the data stream and buffers the received data stream in the data stream buffer 12 (S102). Thereafter, with reference to the data stream buffer 12, the data packet generating unit 13 determines if the data packet can be generated (S103). If the data packet can be generated, then the data packet generating unit 13 extracts necessary data from the data stream buffer 12 to generate the data packet (S104) and buffers the generated data packet in the data packet buffer 14 (S105).

At this time, in the data stream buffer 12, the data packet may be buffered accompanying data representing an output transmitting device and it may be managed in accordance with a separate queue for each output transmitting device. The output transmitting device of the data packet is determined by the data packet generating unit 13. This determination may be transmitted to the transmission control unit 11 by reading a setting file in advance or by other means such as operator input. This is so that it can be detected by the data packet generating unit 13.

Further, the content actually controlled by the data packet generating unit 13 is contained in the configuration information table. It may be carried in the data packet or may be transmitted to other device so that the reception control device 20 can obtain it by any other means.

Figure 7A:
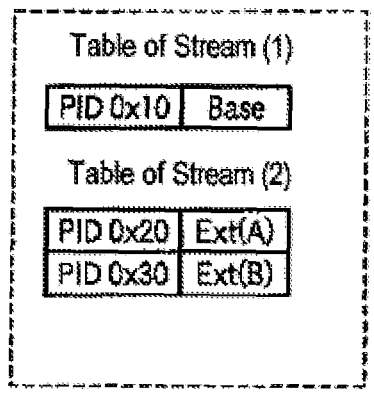
FIG. 7 is a diagram showing an exemplary structure of a configuration information table.
Figure 7B:
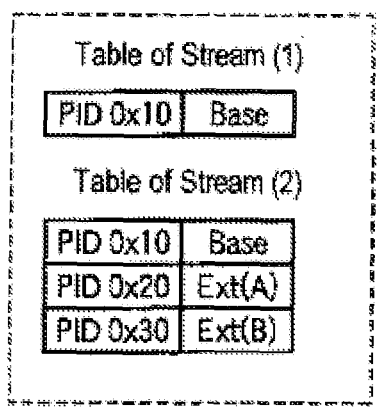

FIG. 7 is a diagram showing an exemplary structure of the configuration information table. FIGS. 7A and 7B show the case of containing the configuration information table in a stream, while FIG. 7C shows the case of referring to the configuration information table outside the stream. As shown in FIG. 4C, there are two streams (1) and (2). In FIGS. 7A to 7C, a table of a stream (1) is a conventional broadcast scheme and only a table representing a structure in the stream (1) is defined so that it is established as an independent stream.

On the contrary, three variations are proposed for a table of a stream (2). FIG. 7A shows the case of representing a structure of an entire stream by defining only a table representing a structure in the stream (2) in the table of the stream (2) and referring to the table of the stream (1) and the table of the stream (2) in combination. FIG. 7B shows the case of including a table representing a structure of an entire stream of the streams (1) and (2) in the table of the stream (2) so as not to refer to the table of the stream (1). FIG. 7C shows the case of preparing an external table and referring to a table outside the stream independently or in combination with the table of the stream (1).

A scheme that can store the configuration information table in the transport stream is pursuant to a typical method. If referring to information outside the transport stream of FIG. 7C, then it may be stored as a file such as an XML file in a server to obtain the same.

Since the data stream is divided into a plurality of data packet groups for each transmission path, it is necessary to include synchronization information for reconstruction in the reception control unit 21.

Generally, since time stamps TS1-TS4 are given and included in a transport stream as shown in FIG. 4B, fine grained timing synchronization can be acquired referring to this value. However, since the RF transmission path and the IP transmission path are greatly different from each other in terms of transmission conditions and delays, there may be a case where accurate synchronization cannot be acquired solely by time stamps. Since the RF transmitting device 50 is a typical digital broadcast transmitting device and an input/output thereof is also pursuant to the typical digital broadcast transmitting device, it cannot add special information.

Accordingly, for synchronization between time stamps, information associated with the data packet transmitted from the RF transmitting unit 51 is stored in the data packet transmitted from the IP transmitting unit 71. For example, a Hash value is obtained from actual data of base layer and a time stamp of data of the base layer, the data packet of an extension layer including the Hash value is transmitted from IP transmitting unit 71. Thereby making it possible to provide accurate synchronization in the reception control unit 21.

Figure 8:
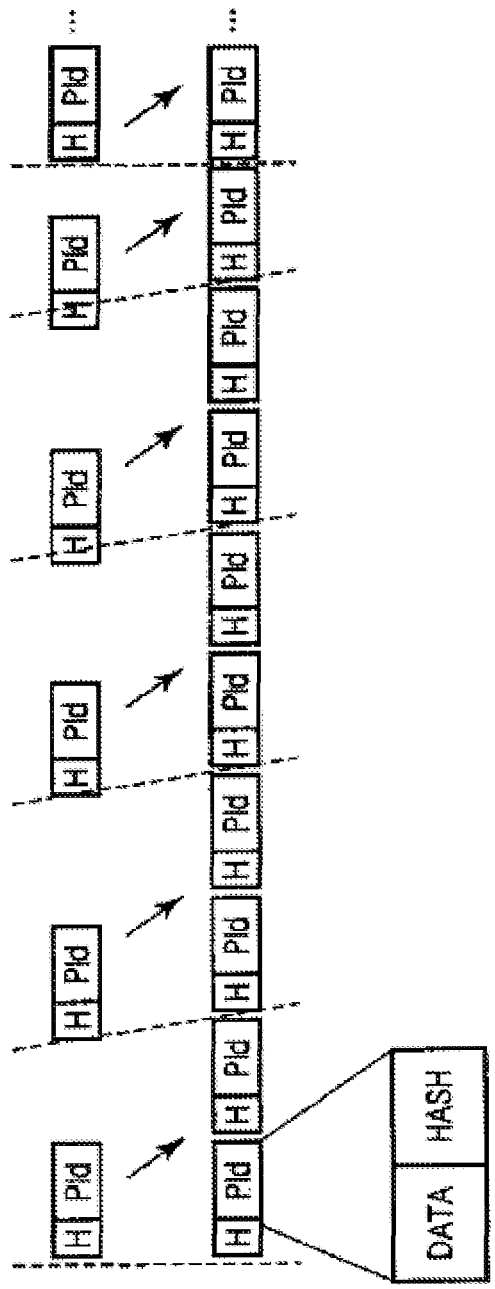
FIG. 8 is a diagram showing an example of a method of storing a Hash value.
Figure 9:
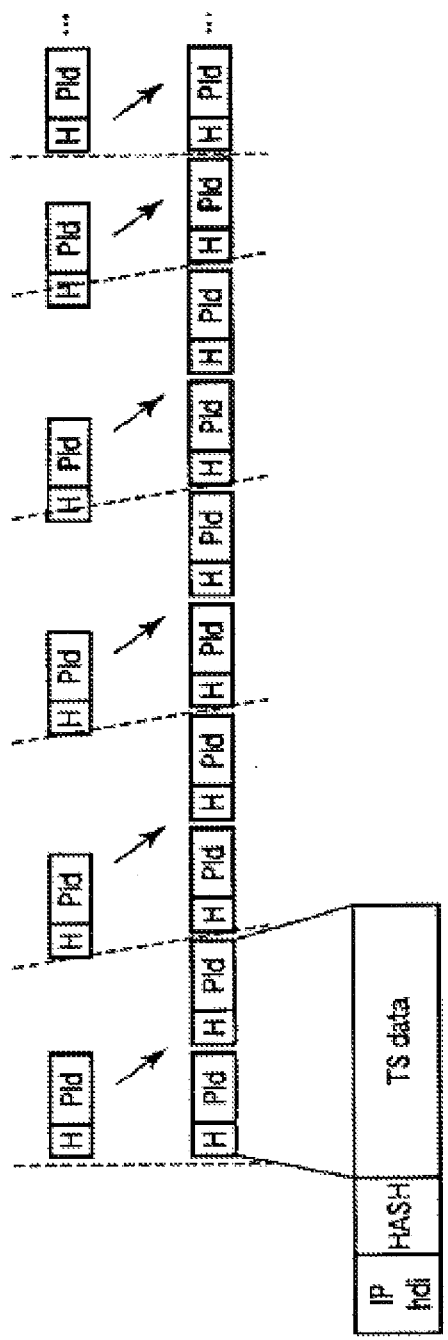
FIG. 9 is a diagram showing another example of a method of storing a Hash value.

FIGS. 8 and 9 are diagrams showing examples of a Hash value storing method.

FIG. 8 shows an exemplary case where a Hash value is stored as section data and separate PID data in a transport stream. In this case, data of a Hash value relating to a data packet containing data of a base layer of a top portion shown in FIG. 4C becomes a single transport stream by being mixed in the transport stream in synchronization with a data packet containing data of an extension layer of a bottom portion shown in FIG. 4C. FIG. 9 shows another exemplary case where a Hash value is stored as a payload or an IP header outside a transport stream. In this case, data of a Hash value relating to a data packet containing data of a base layer of a top portion shown in FIG. 4C becomes a single data packet by being mixed outside the transport stream in synchronization with a data packet containing data of an extension layer of a bottom portion shown in FIG. 4C.

With reference to the data packet buffer 14, the transmission determining unit 15 determines if there is a data packet transmitted through the RF transmitting unit 51 (S106). The transmission determining unit 15 outputs a relevant data packet to the RF transmitting unit 51 if a receiving side and timing correspond thereto (S107). Likewise, with reference to the data packet buffer 14, the transmission determining unit 15 determines if there is a data packet transmitted through the IP transmitting unit 71 (S108). The transmission determining unit 15 outputs a relevant data packet to the IP transmitting unit 71 if a receiving side and timing correspond thereto (S109). At this time, a broadcast TS may be outputted from the RF transmitting unit 51 while an RTP may be outputted from the IP transmitting unit 71. However, a transport protocol thereof is not limited thereto.

(Reception Control Process)

Figure 10:
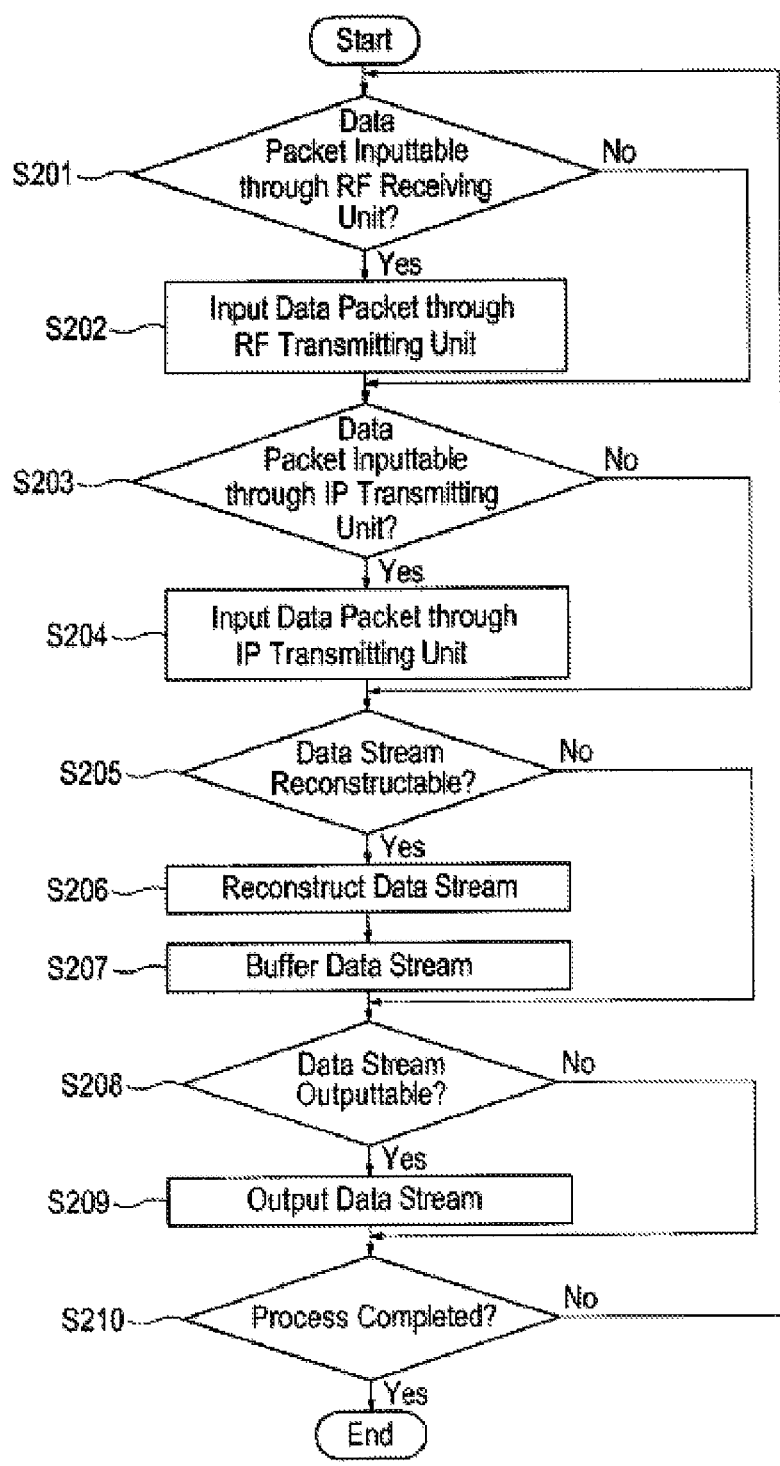
FIG. 10 is a flow chart showing an operation of a reception control device.

FIG. 10 is a flow chart showing an operation in the reception control device 20. With reference to FIG. 10, a description will be given of a process in which the reception control device 20 outputs a data packet, which is inputted from the RF receiving device 60 and the IP receiving device 80, to the decoding device 40.

First, data packets containing hierarchically-encoded data are inputted from the RF receiving device 60 and the IP receiving device 80 (S201, S203). The reception control unit 21 stores the data packets in the data packet buffer 22 (S202, S204). The data stream reconstructing unit 23 obtains a configuration information table in the data packet or by any other means and reconstructs a data stream on the basis of the configuration information table (S205, S206). The data stream may be synchronized because the data stream reconstructed by using the information associated with the data packet, which is stored in the data packet transmitted from the transmission control unit 11 to the IP transmission path, and the time stamps of each elementary stream.

The reconstructed data stream includes hierarchically-encoded data. The reconstructed data stream is buffered in the data stream buffer 24 (S207) and is outputted to the decoding device 40 according to a request of the control unit 91 (S208, S209). Basically, the data stream inputted into the transmission control unit 11 and the data stream outputted from the reception control unit 21 have the same content unless there is a data loss caused by a packet loss during transmission.

As described above, according to the above embodiment, it is possible to absorb a difference that occurs when video data encoded by, for example, an H.264/SVC format are transmitted using different types of transmission paths (e.g., broadcast and communication). Accordingly, it is possible to improve the quality of a video played by combining received data of the communication side while operating the conventional digital broadcast transmitting equipment and receiver for the broadcast side.

Modified Embodiment 1

In a modified embodiment 1, the transmission of base layer data is made to be redundancy. The IP transmitting unit 71 transmits data of a base layer transmitted by an RF side through an IP communication network together with data of an extension layer transmitted by an IP side. In the IP side, the data packet generating unit 13 in the transmission control unit 11 may generate a single data packet group based on data of a base layer and data of an extension layer, or transmit each data packet group separately.

Like the above embodiment, the modified embodiment 1 can improve the quality of a video played by combining received data of the IP side while operating the conventional broadcast wave transmitting/receiving equipment for the RF side. Also, it is possible to accurately play back data solely by the IP side even when a data loss occurs due to a packet loss in the RF side.

Modified Embodiment 2

In the above embodiment, the RF transmitting device 50 is a typical digital broadcast transmitting device and an input/output thereof is also pursuant to the typical digital broadcast transmitting device. However, a modified embodiment 2 can greatly modify various parameters of the RF side or can optionally modify a fundamental method. In this case, it is possible to store the information associated with synchronization in the packets of the RF transmission path and the IP transmission path. For example, the data packet generating unit 13 in the transmission control unit 11 may store this information in a transport packet, in a stream of transport packets like PCR, in a trailer or a header of a TS packet like TTS and partial TS, or in a trailer or a header of an RTP packet.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A transmitting system comprising:
a transmission control unit for packetizing data of a first layer and data of a second layer to output a data packet of the first layer and a data packet of the second layer, wherein the data of the first layer is a data of a base layer that is a data of a conventional digital broadcast, wherein the data of the second layer is a data of an extension layer corresponding to difference data to enhance the data of the base layer;
a first transmitting unit for transmitting the data packet of the first layer to a receiving device through a first transmission path; and
a second transmitting unit for transmitting the data packet of the second layer to the receiving device through a second transmission path that is different from the first transmission path in terms of transmission schemes;
a first receiving unit for receiving the data packet transmitted through the first transmission path;
a second receiving unit for receiving the data packet transmitted through the second transmission path; and
a reception control unit for reconstructing a hierarchically-encoded data stream that is of higher quality than the base layer on the basis of a configuration information table comprising a data structure that correlates the data packets to the first or second layers, wherein the configuration information table is contained in the data packet received by the first receiving unit and the data packet received by the second receiving unit wherein the first transmitting unit transmits the data packet of the first layer, and a first configuration information table representing a data structure in the data packet of the first layer, to a receiving device through a first transmission path; the second transmitting unit transmits the data packet of the second layer, and a second configuration information table representing a data structure in the data packet of the second layer, to the receiving device through a second transmission path; the first receiving unit receives the data packet and the first configuration information table transmitted through the first transmission path; the second receiving unit receives the data packet and the second configuration information table transmitted through the second transmission path; and the reception control unit reconstructs the hierarchically-encoded data stream on the basis of the first configuration information table and the second configuration information table; wherein the first transmitting unit transmits the data packet of the first layer, and a first configuration information table representing a data structure in the data packet of the first layer, to a receiving device through a first transmission path; the second transmitting unit transmits the data packet of the second layer, and a second configuration information table representing a data structure in the data packets of the first layer and the second layer, to the receiving device through a second transmission path; the first receiving unit receives the data packet and the first configuration information table transmitted through the first transmission path; the second receiving unit receives the data packet and the second configuration information table transmitted through the second transmission path; and the reception control unit reconstructs the hierarchically-encoded data stream on the basis of the second configuration information table.

2. The transmitting system of claim 1, wherein the hierarchically-encoded data stream is constructed in a format based on H.264/SVC (Scalable Video Coding).

3. The transmitting system of claim 2, wherein
the transmission control unit adds a time stamp, which is contained in the hierarchically-encoded data stream, to the data packet of the first layer and the data packet of the second layer, and
the reception control unit performs synchronization between the data of the first layer and the data of the second layer on the basis of the time stamp contained in the data packet received by the first receiving unit and the second receiving unit.

4. The transmitting system of claim 1, wherein
the transmission control unit adds information for performing synchronization between the data of the first layer and the data of the second layer to the data packet of the second layer, and the reception control unit performs synchronization between the data of the first layer and the data of the second layer on the basis of the information contained in the data packet received by the second receiving unit.

5. The transmitting system of claim 1 wherein the first transmission path comprises an RF transmission path and the second transmission path comprises an IP transmission path.

6. The transmitting system of claim 1 wherein
the first transmitting unit transmits the data packet of the first layer, and a first configuration information table representing a data structure in the data packet of the first layer, to a receiving device through a first transmission path;

the first receiving unit receives the data packet and the first configuration information table transmitted through the first transmission path; and the reception control unit reconstructs the hierarchically-encoded data stream on the basis of the first configuration information table and a second configuration information table outside stream, wherein the second configuration information table represents a data structure in the data packets of the first layer and the second layer.

7. A receiving device for receiving data of a first layer and data of a second layer from a transmitting device, wherein the data of the first layer is a data of a base layer that is data of a conventional digital broadcast, wherein the data of the second layer is a data of an extension layer corresponding to difference data to enhance the data of the base layer, comprising:
a first receiving unit for receiving the data packet transmitted through the first transmission path;

a second receiving unit for receiving the data packet transmitted through the second transmission path; and a reception control unit for reconstructing a hierarchically-encoded data stream that is of higher quality than the base layer on the basis of a configuration information table comprising a data structure that correlates the data packets to the first or second layers, wherein the configuration information table is contained in the data packet received by the first receiving unit and the data packet received by the second receiving unit wherein the second transmitting unit transmits the data packet of the second layer, and a second configuration information table representing a data structure in the data packet of the second layer, to the receiving device through a second transmission path; the first receiving unit receives the data packet, and a first configuration information table representing a data structure in the data packet of the first layer, transmitted through the first transmission path;

the second receiving unit receives the data packet, and a second configuration information table representing a data structure in the data packet of the second layer, transmitted through the second transmission path; and the reception control unit reconstructs the hierarchically-encoded data stream on the basis of the first configuration information table and the second configuration information table; wherein the first receiving unit receives the data packet, and a first configuration information table representing a data structure in the data packet of the first layer, transmitted through the first transmission path; the second receiving unit receives the data packet, and a second configuration information table representing a data structure in the data packets of the first layer and the second layer, transmitted through the second transmission path; and the reception control unit reconstructs the hierarchically-encoded data stream on the basis of the second configuration information table.

8. The receiving device of claim 7, wherein the hierarchically-encoded data stream is constructed in a format based on H.264/SVC (Scalable Video Coding).

9. The receiving device of claim 7, wherein
the reception control unit performs synchronization between the data of the first layer and the data of the second layer on the basis of a time stamp contained in the data packet received by the first receiving unit and the second receiving unit.

10. The receiving device of claim 7, wherein
the transmitting device adds information for performing synchronization between the data of the first layer and the data of the second layer to the data packet of the second layer, and the reception control unit performs synchronization between the data of the first layer and the data of the second layer on the basis of information for performing synchronization between the data of the first layer and the data of the second layer contained in the data packet received by the second receiving unit.

11. The receiving device of claim 7, wherein the transmitting device comprises:
a transmission control unit for packetizing the data of a first layer and data of a second layer to output a data packet of the first layer and a data packet of the second layer;

a first transmitting unit for transmitting the data packet of the first layer to a receiving device through the first transmission path; and a second transmitting unit for transmitting the data packet of the second layer to the receiving device through the second transmission path that is different from the first transmission path in terms of transmission schemes.

12. The receiving device of claim 7 wherein the first transmission path comprises an RF transmission path and the second transmission path comprises an IP transmission path.

13. The receiving device of claim 7 wherein
the first receiving unit receives the data packet, and the first configuration information table representing a data structure in the data packet of the first layer, transmitted through the first transmission path; and the reception control unit reconstructs the hierarchically-encoded data stream on the basis of the first configuration information table and a second configuration information table outside stream, wherein the second configuration information table represents a data structure in the data packets of the first layer and the second layer.

14. A video transmission method comprising:
packetizing data of a first layer and data of a second layer of a data stream, wherein the data of the first layer is a data of a base layer that is data of a conventional digital broadcast, wherein the data of the second layer is a data of an extension layer corresponding to difference data to enhance the data of the base layer;

transmitting the data packet of the first layer to a receiving device through a first transmission path; and transmitting the data packet of the second layer to the receiving device through a second transmission path that is different from the first transmission path in terms of transmission schemes;

wherein the first layer and the second layer are operable to be reconstructed into a hierarchically-encoded data stream that is of higher quality than the base layer by the receiving device on the basis of a configuration information table comprising a data structure that correlates the data packets to the first or second layers, wherein the configuration information table is contained in the data packet of the first layer and the data packet of the second layer wherein the transmitting includes transmitting the data packet of the first layer, and a first configuration information table representing a data structure in the data packet of the first layer, to a receiving device through a first transmission path; the transmitting includes transmitting the data packet of the second layer, and a second configuration information table representing a data structure in the data packet of the second layer, to the receiving device through a second transmission path; and wherein the first layer and the second layer are operable to be reconstructed into a hierarchically-encoded data stream by the receiving device on the basis of the first configuration information table and the second configuration information table; wherein the transmitting includes transmitting the data packet of the first layer, and a first configuration information table representing a data structure in the data packet of the first layer, to a receiving device through a first transmission path; the transmitting includes transmitting the data packet of the second layer, and a second configuration information table representing a data structure in the data packets of the first layer and the second layer, to the receiving device through a second transmission path; wherein the first layer and the second layer are operable to be reconstructed into a hierarchically-encoded data stream by the receiving device on the basis of the second configuration information table.

15. The video transmission method of claim 14 wherein the hierarchically-encoded data stream is constructed in a format based on H.264/SVC (Scalable Video Coding).

16. The video transmission method of claim 14 further comprising:
adding a time stamp, which is contained in the hierarchically-encoded data stream, to the data packet of the first layer and the data packet of the second layer, and
synchronizing between the data of the first layer and the data of the second layer on the basis of the time stamp contained in the data packet received by the receiving device.

17. The video transmission method of claim 14 wherein the first transmission path comprises an RF transmission path and the second transmission path comprises an IP transmission path.

18. The video transmission method of claim 14 wherein
the transmitting includes transmitting the data packet of the first layer, and a first configuration information table representing a data structure in the data packet of the first layer, to a receiving device through a first transmission path; and
wherein the first layer and the second layer are operable to be reconstructed into a hierarchically-encoded data stream by the receiving device on the basis of the first configuration information table and a second configuration information table outside stream, wherein the second configuration information table represents a data structure in the data packets of the first layer and the second layer.

19. A transmitting device comprising:
a transmission control unit for packetizing data of a first layer and data of a second layer to output a data packet of the first layer and a data packet of the second layer, wherein the data of the first layer is a data of a base layer that is data of a conventional digital broadcast, wherein the data of the second layer is a data of an extension layer corresponding to difference data to enhance the data of the base layer;
a first transmitting unit for transmitting the data packet of the first layer to a receiving device through a first transmission path; and
a second transmitting unit for transmitting the data packet of the second layer to the receiving device through a second transmission path that is different from the first transmission path in terms of transmission schemes;
wherein the receiving device reconstructs a hierarchically-encoded data stream that is of higher quality than the base layer, on the basis of a configuration information table comprising a data structure that correlates the data packets to the first or second layers wherein the first transmitting unit transmits the data packet of the first layer, and a first configuration information table representing a data structure in the data packet of the first layer, to a receiving device through a first transmission path; and the second transmitting unit transmits the data packet of the second layer, and a second configuration information table representing a data structure in the data packet of the second layer, to the receiving device through a second transmission path; wherein the receiving device reconstructs the hierarchically-encoded data stream on the basis of the first configuration information table and the second configuration information table; wherein the first transmitting unit transmits the data packet of the first layer, and a first configuration information table representing a data structure in the data packet of the first layer, to a receiving device through a first transmission path; and the second transmitting unit transmits the data packet of the second layer, and a second configuration information table representing a data structure in the data packets of the first layer and the second layer, to the receiving device through a second transmission path; wherein the receiving device reconstructs the hierarchically-encoded data stream on the basis of the second configuration information table; wherein the first transmitting unit transmits the data packet of the first layer, and a first configuration information table representing a data structure in the data packet of the first layer, to a receiving device through a first transmission path; wherein the receiving device reconstructs the hierarchically-encoded data stream on the basis of the first configuration information table and a second configuration information table outside stream, wherein the second configuration information table represents a data structure in the data packets of the first layer and the second layer.

* * * * *